United States Patent Office 3,409,651
Patented Nov. 5, 1968

3,409,651
MONOTHIO CONTAINING RADICAL BIS(DI-ORGANOTIN CARBOXYLATES)
James A. Horrocks, Suffolk, England, assignor to Bakelite Xylonite Limited, a corporation of Great Britain
No Drawing. Filed Aug. 31, 1965, Ser. No. 484,126
Claims priority, application Great Britain, Sept. 2, 1964, 35,990/64
4 Claims. (Cl. 260—429.7)

ABSTRACT OF THE DISCLOSURE

The present invention relates to a stabilizer composition for polymeric substances having the general formula:

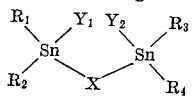

wherein $R_1$, $R_2$, $R_3$, and $R_4$ are members selected from the group consisting of alkyl, alkaryl, aralkyl and aryl radicals having from 2 to 20 carbon atoms, X is a dibasic radical containing sulfur and $Y_1$ and $Y_2$ are each a monobasic radical.

---

The present invention relates to organo-tin compounds, methods for their production, and polymeric compositions containing them.

Many organo-tin compounds have been prepared which have found industrial use as stabilizers for polymeric compositions, for example for polyvinyl chloride. More recently thio-tin organic compounds have been increasingly used for this purpose. Some such compounds, however, have suffered from the disadvantage that compositions containing them have had an unpleasant odor, arising from the decomposition of the stabilizer during manufacture and processing of the polymeric composition and shaped articles made therefrom. The compositions have also shown a tendency to discolor after prolonged processing.

It is an object of the present invention to provide a new composition having improved resistance to discoloration during processing.

It is a further object of the invention to provide an improved stabilizer for polymeric compositions, especially polyvinyl chloride.

The present invention accordingly provides a stabilizer composition for polymeric substances, which comprises a product obtainable by reacting together one or more compounds of the formula

wherein $R_1$ and $R_2$, which may be the same or different, each represent an alkyl, alkaryl, aralkyl or aryl radical, having from 2 to 20 carbon atoms, one or more compounds of the formula YH, wherein Y represents a monobasic monovalent radical, and one or more compounds of the formula HXH, wherein X represents a dibasic divalent radical containing sulphur, and a process for the manufacture of the stabilizer composition.

The present invention further provides a process for the manufacture of a polymeric composition of improved stability to discoloration, which comprises admixing a vinyl polymer, especially polyvinyl chloride or a vinyl chloride copolymer, with a product obtainable by reacting together one or more compounds of the formula

one or more compounds of the formula YH, and one or more compounds of the formula HXH, where $R_1$, $R_2$, Y and X have the meanings given above, and a polymeric composition produced thereby.

Advantageously, the composition contains from 1 to 5%, preferably about 2% by weight of the reaction product, based on the weight of the polymer.

The reaction may suitably be carried out by heating the starting materials to a temperature and for a time sufficient to remove from the reaction mixture the water formed during the reaction, a temperature of about 120° C. generally being suitable.

In general, the reaction product will comprise one or more compounds of the general formula

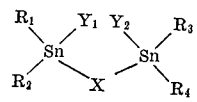

wherein $R_1$, $R_2$, $R_3$ and $R_4$, which may be the same or different, each represent an alkyl, alkaryl, aralkyl or aryl radical containing from 2 to 20 carbon atoms, $Y_1$ and $Y_2$ which may be the same or different each represent a monobasic radical, and X represents a dibasic radical containing sulphur.

Advantageously, $R_1$, $R_2$, $R_3$ and $R_4$ are alkyl radicals, preferably n-butyl radicals. HXH may represent, for example, β-mercaptopropionic acid, bis-carboxy-methylthiomethane, 1,2-dicarboxymethylthioethane, 1,4-dicarboxymethylthiobutane, 2,2'-dicarboxymethylthiodiethyl ether, S-benzyl thioglycollic acid, or mixtures of two or more such compounds.

$Y_1H$ and $Y_2H$ may advantageously represent a fatty acid, the monoester (or half ester) of a dibasic acid, or the thio ester of a fatty acid, for example 2-ethylhexyl thioglycollate, 2-ethylhexyl maleate, laurylmercaptoacetic acid, or mixtures of two or more such compounds. Advantageously, $Y_1$ and $Y_2$ represent radicals containing up to 20 carbon atoms, and within this limit, have as high a molecular weight as possible, so that for a given stabilizing effect, a reduction in cost is achieved.

When $Y_1$ and $Y_2$ are different and/or $R_1$, $R_2$, $R_3$ and $R_4$ are different, and/or when X is an asymmetric radical, the product of the reaction may comprise more than one compound of the general formula given above, as well as compounds not falling within the scope of the general formula. In general, it is preferred to react together stoichiometric quantities of the starting materials for the production of a compound within the general formula.

It is believed although it is to be understod that the invention is in no way limited by any theoretical explanation, that the improvement in stabilizing properties achieved by the use of the product of the present invention is due to the formation of compounds in which the sulphur atoms are tightly bound within the molecule, thus reducing the tendency for odoriferous by-products to be produced during processing.

The following examples illustrate the invention. In Examples 1 and 3 to 11, the compound named at head of the example, and its isomers, are believed to constitute a proportion of the resulting reaction product and the stabilizing effect, illustrated in Examples 2 and 12, is believed to be largely due to these compounds. It is to be understood that the invention is in no way to be limited by this explanation of the effect of the products.

Example 1

Preparation of a composition comprising dibutyltin 2-ethylhexylmaleate salt of β-(dibutyltin-2-ethylhexylmaleate)thiopropionic acid.

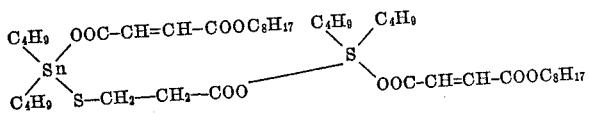

26 gm. 2-ethylhexanol and 19.6 gm. maleic anhydride were heated at 110° C. until a clear liquid was obtained. 100 ml. benzene and 24.8 gm. di-butyl tin oxide were then added, and the mixture refluxed in a Dean and Stark apparatus until 1.8 ml. water were removed. A further 24.8 gm. dibutyl tin oxide was then added and the mixture again heated until a clear liquid was obtained. 10.6 gm. β-mercaptopropionic acid was added, and the resulting mixture again refluxed until 1.8 ml. water were removed. The benzene was then distilled off under vacuum, and the product recovered as a yellow liquid.

Example 2

The product obtained in Example 1 was incorporated into a polyvinyl chloride resin by milling. The stability of the composition containing the stabilizer of the invention (denoted by "Stabilizer 1024" in the table below) was compared with compositions containing known stabilizers. In the table, the parts are by weight

| Formulation No | 1 | 2 | 3 |
|---|---|---|---|
| Breon 202 | 100 | 100 | 100 |
| Stabilizer 1024 | 2 | | |
| Dibutyl tin di(2-ethylhexylthioglycollate) | | 2 | |
| Dibutyl tin maleate | | | 2 |
| Wax OP | 0.15 | 0.15 | 0.15 |

Breon 202 is a copolymer of vinyl chloride and vinylidene chloride containing 4% vinylidene chloride.

Each composition was milled on a two roll mill at 175° C. Samples were removed at 5 minute intervals to examine color development. Formulation No. 1 was still glass clear after 45 minutes, whilst both No. 2 and No. 3 showed a slight yellow color after 40 minutes.

Example 3 (Stabilizer No. 1025)

Composition comprising S-dibutyl tin mono(2-ethylhexyl thioglycollate) mono β-mercaptopropionic acid salt of S-dibutyl tin mono (2-ethylhexyl maleate).

10.8 g. of β-mercaptopropionic acid, 22.8 g. of 2-ethylhexyl maleate and 22.4 g. of 2-ethylhexyl thioglycollate were intimately mixed by stirring, and heated to 120° C. 49.8 g. of dibutyl tin oxide was added, and the mixture stirred and heated at 120° C. until all water had been removed. The product was a clear, slightly yellow liquid, having a refractive index at 25° C. of 1.5200.

Example 4 (Stabilizer No. 1026)

Composition comprising S-dibutyl tin mono(2-ethylhexyl thioglycollate) 1,2 - dicarboxymethylthiomethane salt of dibutyl tin mono(2-ethylhexyl maleate).

The procedure of Example 3 was followed, using the following quantities of reactants:

| | G. |
|---|---|
| Bis-carboxymethylthiomethane (HOOC—CH$_2$—SCH$_2$—SCH$_2$—COOH) | 19.4 |
| 2-ethylhexyl maleate | 22.8 |
| 2 ethylhexyl thioglycollate | 22.4 |
| Dibutyl tin oxide | 49.8 |

The product is a white waxy solid, melting range 113° C.–121° C.

Example 5 (Stabilizer No. 1027)

Composition comprising S-dibutyl tin mono (2-ethylhexyl thioglycollate) 1,2-dicarboxymethyl thioethane salt of dibutyl tin mono(2-ethylhexyl maleate).

The procedure of Example 3 was followed, using the following quantities of reactants:

| | G. |
|---|---|
| 1,2-di(carboxymethylthio)ethane | 21.0 |
| 2-ethylhexyl maleate | 22.8 |
| 2-ethylhexyl thioglycollate | 22.4 |
| Dibutyl tin oxide | 49.8 |

The product is a white waxy solid, melting range 129° C.–132° C.

Example 6 (Stabilizer No. 1028)

Composition comprising S-dibutyl tin mono(2-ethylhexyl thioglycollate)-1,4 - di(carboxymethylthio)butane salt of dibutyl tin mono(2-ethylhexyl maleate).

The procedure of Example 3 was followed, using the following quantities of reactants:

| | G. |
|---|---|
| 1,4-di(carboxymethylthio)butane | 23.8 |
| 2-ethylhexyl maleate | 22.8 |
| 2-ethylhexyl thioglycollate | 22.4 |
| Dibutyl tin oxide | 49.8 |

The product is a white waxy solid, melting range 115° C.–122° C.

Example 7 (Stabilizer No. 1029)

Composition comprising S-dibutyl tin mono(2-ethylhexyl thioglycollate) - 2,2'-di(carboxymethylthio)diethyl ether salt of dibutyl tin mono(2-ethylhexyl maleate).

The procedure of Example 3 was followed, using the following quantities of reactants:

| | G. |
|---|---|
| 2,2'-di(carboxymethylthio)diethyl ether (HOOCCH$_2$—S(CH$_2$)$_2$—O(CH$_2$)$_2$—SCH$_2$COOH) | 25.4 |
| 2-ethylhexyl maleate | 22.8 |
| 2-ethylhexyl thioglycollate | 22.4 |
| Dibutyl tin oxide | 49.8 |

The product is a slightly yellow clear liquid refractive index, at 25° C. 1.5086.

Example 8 (Stabilizer No. 1030)

Composition comprising dibutyl tin phenyl mercapto acetate mono-β-mercaptopropionic acid salt of dibutyl tin mono(2-ethylhexyl maleate).

The procedure of Example 3 was followed, using the following quantities of reactants

| | G. |
|---|---|
| β-Mercaptopropionic acid | 10.8 |
| Phenylmercaptoacetic acid | 16.8 |
| 2-ethylhexyl maleate | 22.8 |
| Dibutyl tin oxide | 49.8 |

The product is a white waxy solid, melting range 89°–110° C.

Example 9 (Stabilizer 1031)

Composition comprising dibutyl tin mono S-benzyl thioglycollate mono β-mercaptopropionic acid salt of dibutyl tin mono(2-ethylhexyl maleate).

The procedure of Example 3 was followed, using the following quantities of reactants.

| | G. |
|---|---|
| S-benzyl thioglycollic acid | 18.2 |
| β-Mercaptopropionic acid | 10.8 |
| 2-ethylhexyl maleate | 22.8 |
| Dibutyl tin oxide | 49.8 |

The product is a clear yellow liquid, refractive index at 25° C. 1.5116.

Example 10 (Stabilizer 1032)

Composition comprising dibutyl tin (laurylmercaptoacetate) mono β-mercaptopropionic acid salt of dibutyl tin mono(2-ethylhexyl maleate).

The procedure of Example 3 was followed, using the following quantities of reactants:

| | G. |
|---|---|
| Laurylmercaptoacetic acid | 26.0 |
| β-Mercaptopropionic acid | 10.8 |
| 2-ethylhexyl maleate | 22.8 |
| Dibutyl tin oxide | 49.8 |

The product is a clear slightly yellow liquid, refractive index at 25° C. 1.4959.

Example 11 (Stabilizer No. 1033)

Composition comprising bis(dibutyl tin 2 ethylhexyl thioglycollate)-β-mercaptopropionate.

The procedure of Example 3 was followed, using the following quantities of reactants:

| | G. |
|---|---|
| 2-ethylhexyl maleate | 45.6 |
| β-Mercaptopropionic acid | 10.8 |
| Dibutyl tin oxide | 49.8 |

The product is a clear slightly yellow liquid, refractive index at 25° C. 1.5103.

Example 12

Each stabilizer prepared as in Examples 3 to 11 was incorporated into a polyvinyl composition by milling, the following parts by weight being used:

| | Parts |
|---|---|
| Breon 202 resin | 100 |
| Stabilizer | 2 |
| Wax OP | 1.5 |

Each composition was milled on a two roll mill at 175° C., samples being removed at 5 minute intervals to observe the development of discoloration. The table below shows the time taken for the onset of discoloration for each composition, and for compositions containing known stabilizers. It was observed that there was no odor from the finished sheets, in contrast to polyvinyl chloride stabilized with known sulphur-containing organo-tin compounds.

TABLE

| Staabilizer: | Time in minutes taken for initial color development |
|---|---|
| Di butyl tin maleate | 35 |
| Di butyl tin 2 ethylhexyl thioglycollate | 45 |
| No.: | |
| 1025 | 60 |
| 1026 | 55 |
| 1027 | 45 |
| 1028 | 40 |
| 1029 | 45 |
| 1030 | 60 |
| 1031 | 45 |
| 1032 | 50 |
| 1033 | 50 |

I claim:

1. A stabilizer composition for polymeric substances which comprises a compound of the formula

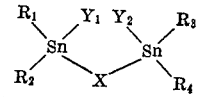

wherein $R_1$ and $R_2$ are selected from the group consisting of alkyl, alkaryl, aralkyl and aryl radical having from 2 to 20 carbon atoms, $Y_1$ and $Y_2$ are monobasic monovalent radicals having 2 to 20 carbon atoms, each radical being bonded to a tin atom by a group selected from the group consisting of carboxyl, oxy and thio and X is a dibasic divalent radical containing one sulfur atom, said divalent radical having terminal groups selected from the group consisting of carboxyl, oxy and thio.

2. The composition of claim 1 wherein $R_1$, $R_2$, $R_3$ and $R_4$ are n-butyl radicals.

3. The composition of claim 1 wherein X is a dibasic radical of compositions selected from the group consisting of β-mercaptopropionic acid, and S-benzylthioglycollic acid.

4. The composition of claim 1 wherein $Y_1$ and $Y_2$ are monobasic radicals of compositions selected from the group consisting of 2 ethylhexyl maleate, of 2-ethylhexyl thioglycollate and of laurylmercaptoacetic acid.

References Cited

UNITED STATES PATENTS 2,857,413  10/1958  Weinberg ——————— 260—429.7

FOREIGN PATENTS 165,091  10/1958  Sweden.
344,722  4/1960  Switzerland.

TOBIAS E. LEVOW, *Primary Examiner.*

W. F. W. BELLAMY, *Assistant Examiner.*